United States Patent Office 3,452,697
Patented July 1, 1969

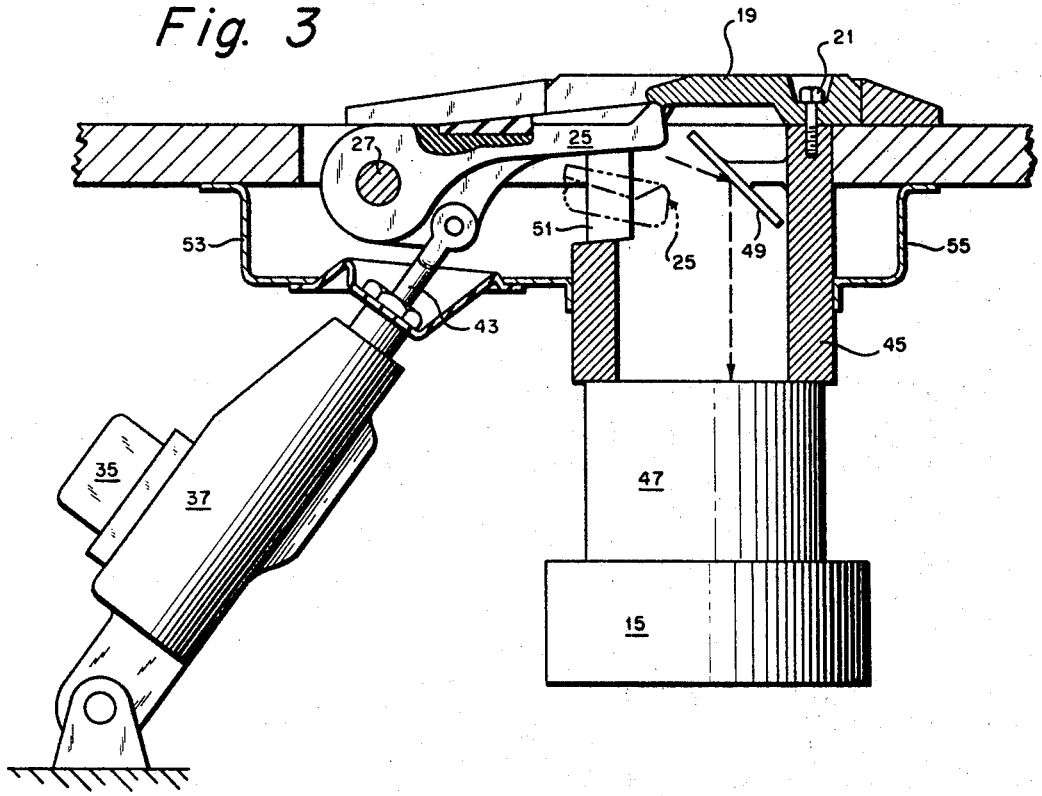
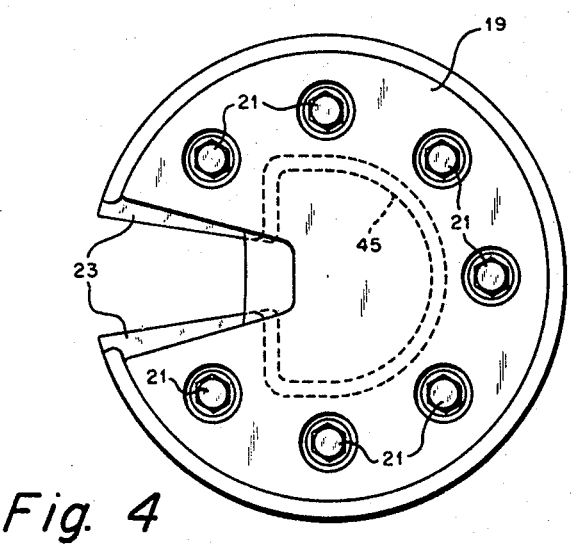

3,452,697
RADIANT ENERGY ACTUATED HYDRAULIC PROTECTION SYSTEM
David R. Flanders, Pottstown, Pa., assignor, by mesne assignments, to the United States of America as represented by the Secretary of the Navy
Filed Oct. 18, 1967, Ser. No. 676,688
Int. Cl. B63g 11/00
U.S. Cl. 114—43.5        8 Claims

ABSTRACT OF THE DISCLOSURE

The invention described herein relates to an improved pilot landing aid television system in which aircraft landings on the flight deck of an aircraft carrier are viewed through a low contour fixture on the carrier flight deck and transmitted to television recording equipment located below deck. The flight deck viewing fixture which is an important part of the invention features a wedge-shaped deflector arm that pivots downwardly during the landing operation and exposes the low angle field of view of the incoming aircraft to the television recording equipment.

---

The present invention relates to a novel and improved apparatus for receiving light energy from a low angle field of view on a planar surface without appreciably obstructing the continuity of the planar surface. More particularly, the invention relates to a novel and improved pilot landing aid television system for recording aircraft landings on the flight deck of an aircraft carrier which provides a maximum level of light energy and a full field of view of an incoming aircraft during a landing operation with minimal physical obstruction on the landing surface.

Television systems are now often used on naval aircraft carriers to record the landing operations of its various incoming aircraft. In apparatus of this kind, light energy from the incoming aircraft normally passes through the viewing aperture of a fixture positioned on the flight deck of the carrier and is then reflected downwardly to television recording equipment that is suitably mounted below deck. The over-all height of the fixture on the flight deck is limited so as to minimize obstruction to overrunning aircraft. At the same time, the fixture must extend upwardly far enough to receive a sufficient level of light energy from the incoming aircraft to insure a good quality television picture. Considerable difficulty has been experienced heretofore in devising a suitable flight deck viewing fixture that simultaneously meets the desired physical and optical requirements of the system particularly during landing operations at night.

It is therefore a principal object of the invention to provide novel and improved apparatus for viewing and recording aircraft landing operations on the flight deck of a naval aircraft carrier.

It is a further object of the invention to provide a novel and improved pilot landing aid television system in which the obstruction height of the flight deck viewing fixture is substantially decreased.

It is a further object of the invention to provide a novel and improved pilot landing aid television system in which there is a significant increase in the optical efficiency of the centerline camera equipment.

Other objects and many of the attendant advantages of this invention will be readily appreciated as the same becomes better understood by reference to the following detailed description when considered in connection with the accompanying drawing wherein:

FIG. 3 is a cross-sectional view of the pilot landing aid television apparatus shown in FIG. 1; and FIG. 4 is a plan view of one of the flight deck viewing fixtures of the pilot landing aid television apparatus shown in FIG. 1.

Figure 1:
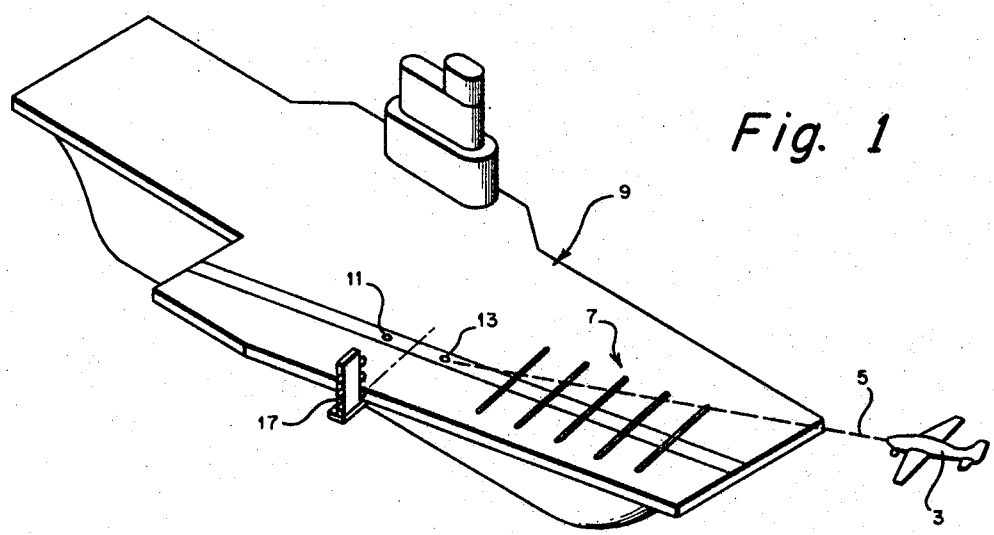
FIG. 1 is a perspective view of an aircraft approaching a carrier for a landing in which arresting gear equipment, Fresnel lens apparatus, and the flight deck viewing fixtures of the pilot landing aid television system of the invention are diagrammatically illustrated.
Figure 2:
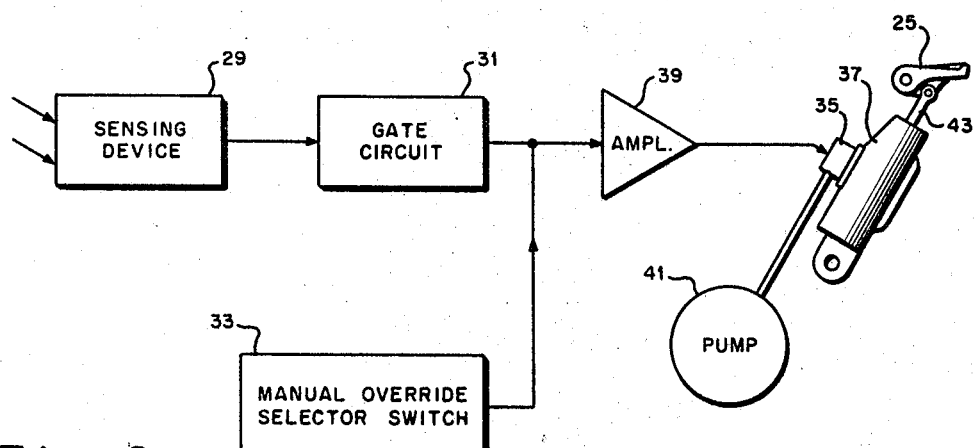
FIG. 2 is a diagrammatic view of the electronic-fluid system that controls operation of the deck aperture deflector arm of the pilot landing aid television apparatus of the invention.

Referring now to the various figures of the drawing, it will be noted that the incoming aircraft 3 is shown progressing along its proper glide path 5 toward the conventional arresting cables 7 of the aircraft arresting apparatus which extend across the flight deck landing strip of the carrier 9. The apertures 11 and 13 in the deck of the carrier into which light from the incoming aircraft enters in its passage to the camera or other recording device 15 below deck are positioned on the landing strip centerline preferable predetermined equal distances fore and aft of the carrier Fresnel lens landing device 17. As will be more apparent hereinafter, only one aperture and its associated recording equipment at a time is necessary to record the aircraft landing operations. The other aperture and its associated apparatus serves a back-up equipment for use in the event that servicing of the apparatus associated with the said one aperture is required.

Inasmuch as the equipment associated with the apertures 11 and 13 on the flight deck is identical, only that associated with aperture 13 will be described herein in detail. As shown in FIGS. 3 and 4 of the drawing, the generally eliptically-shaped cover plate 19 is disposed over the aperture 13 in the carrier flight deck and is secured thereto by the studs 21 or in any other suitable conventional manner. A wedge-shaped portion of the cover plate 19 is cut away as at 23 to form an elongated narrow slit into the aperture 13. In this way, as will be more apparent hereinafter, under desired conditions, ample light energy is directed into the aperture 13 through the wedge-shaped slit 23 which is too narrow to adversely affect passage of the wheels of the landing or maneuvering aircraft as they pass thereover. The deflector arm 25 is pivotably disposed in the wedge-shaped cut-out portion of the cover plate 19 as at 27 and is normally preferably biased in any suitable conventional manner toward an intermediate position between a fully depressed open position where it admits a maximum amount of light into the aperture 13 and a fully closed position where it provides the equipment in the aperture 13 with a maximum amount of protection from flying debris as the landing aircraft passes thereover.

The infra-red energy sensing device 29 is positioned in any suitable location above deck on the carrier 9 so as to receive and detect radiant energy of a predetermined frequency either transmitted or reflected from the incoming aircraft 3. The conventional electronic gate circuit 31 is coupled to the output circuit of the sensing device 29 and is also selectively energized by the manual override selector switch 33. The output circuit of the gating circuit 31 is coupled to the servo valve 35 of the fluid actuator 37 through the amplifier 39. The servo valve 35 controls flow of fluid from the pump 41 to the fluid actuator 37 which includes an operative reciprocating arm 43 that is mechanically coupled to the bell crank extension of the deflector arm 25.

The generally cylindrical housing 45 is secured to the forward peripheral edge of the aperture 13 in the flight deck of the carrier 9 in any suitable manner and extends downwardly therefrom as shown in FIG. 3 of the drawing. The housing 45 is preferably open at the bottom and is in alignment with the telerelay device 47 and the camera or other recording equipment 15 immediately therebelow.

Inasmuch as the telerelay device 47 is conventional in design and its structural details form no part of the present invention, the same are not included herein for the sake of simplicity. For a complete understanding of the invention, it need only be understood that the relay permits disposition of the camera or recording device 15 an increased distance from the aperture 13 in the deck without losing the full field of view of the incoming aircraft. Similarly, the camera or recording device 15 which is of conventional design by itself forms no part of the invention and is not disclosed herein in detail.

The highly polished mirror or reflector device 49 is fixed at a suitable angle in the upper portion of the housing 45 as shown so as to redirect light energy from the incoming aircraft 3 through the transparent window 51 in the housing 45 downwardly through the telerelay 47 to the camera or recording device 15. Drain scuppers 53 and 55 are preferably secured as shown to the inner peripheral surface of aperture 13 and dispose of incoming water from the flight deck of the carrier through a suitable drain not shown in the drawing.

In operation, when the incoming aircraft 3 reaches a predetermined point on its glide path for a landing on the carrier 9, infra-red energy of a discrete frequency which is transmitted or reflected from the aircraft 3 energizes the electronic sensing device 29. Energization of the sensing device 29, in turn, then energizes the gate circuit 31. The output pulse of the gate circuit 31 is then amplified and fed into the electrical control mechanism of the servo valve 35 of the fluid actuator 37. In this way, fluid energy from the fluid pump and reservoir 41 is controlled so as to retract the reciprocating arm 43 of the actuator 37. Downward movement of the actuator arm 43 and the attached deflector arm 25 opens a predetermined enlarged field of view of the landing operation to the interior of the aperture 13 in the flight deck of the carrier. Light energy from the incoming aircraft 3 then enters the wedge-shaped cut-out portion of the flight deck cover plate 19, passes through the transparent window 51 in the housing 45, and is reflected downwardly through the telerelay 47 to the recording device 15 by the polished mirror 49. In this way, the entire landing operation is readily recorded under relatively high light level conditions. A predetermined interval after aircraft touch down on the flight deck, the sensing device 29, the gate circuit 31 and the servo valve mechanism 35 are deenergized so that the actuator arm 43 and the cover plate deflector arm 25 are operated to their fully closed positions. In this way, the transparent window 51 in the housing 45, the polished mirror 49 and the various lens and other equipment of the telerelay 47 and the recording device 15 are protected from flying debris as the aircraft 3 passes over the cover plate 19.

When desired, operation of the actuator 37 and the deflector arm 25 to its open position can be effected by manual operation of the override selector switch 33. In this way, operation of the system can be checked and/or repaired and maintained.

What is claimed is:
1. In apparatus for pictorially recording aircraft landings on the flight deck of an aircraft carrier, means for directing light from an incoming aircraft to a recording medium comprising:
   (a) a housing substantially inset in a forward portion of an aperture in the carrier flight deck;
   (b) a pictorial recording device positioned below an opening in the bottom of the housing;
   (c) a mirror fixed in the housing so as to direct light from the aircraft landing glide path downwardly to the recording device;
   (d) and a cover plate secured to the flight deck of the carrier that protects the upper extremity of the housing.
2. The apparatus substantially as described in claim 1 wherein the cover plate has a wedge-shaped cut-out portion which is centered on the flight deck landing strip centerline.
3. The apparatus substantially as described in claim 2 and further including a deflector arm pivotably positioned in the wedge-shaped cut-out portion of the cover plate.
4. The apparatus substantially as described in claim 3 and further including means for controlling movement of the deflector arm between a system inoperative position in which the cut-out portion of the cover plate is substantially closed and a downwardly deflected position in which light from the incoming aircraft enters the housing and is directed by the mirror to the recording device.
5. The apparatus substantially as described in claim 4 wherein the deflector arm control means includes an infrared sensing device that detects energy from the incoming aircraft and a servo mechanism that is controlled by energization of the infra-red sensing device and controls movement of the deflector arm.
6. The apparatus substantially as described in claim 1 wherein a telerelay optical lens system is positioned between the mirror and the recording device.
7. The apparatus substantially as described in claim 3 wherein the deflector arm in its full open position deflects downwardly at an angle of approximately 15 degrees.
8. The apparatus substantially as described in claim 7 wherein the cover plate is approximately 11 inches in diameter and the wedge-shaped cut-out section in the cover plate extends through an arc of approximately 14 degrees.

References Cited
UNITED STATES PATENTS 2,938,201  5/1960  Thornton _____ 343—5
3,279,406  10/1966  Ricketts et al. _____ 114—43.5

OTHER REFERENCES

"Interavia" Publication. January 1963, pp. 91–93, copy in 244–114 of Group 315.

TRYGVE M. BLIX, *Primary Examiner.*

U.S. Cl. X.R.
244—114